United States Patent [19]
Bright

[11] 3,944,718
[45] Mar. 16, 1976

[54] ENCLOSURE FOR PAD MOUNTED EQUIPMENT

[76] Inventor: William L. Bright, 0605 SW. Curry St., Portland, Oreg. 97201

[22] Filed: June 19, 1974

[21] Appl. No.: 480,934

[52] U.S. Cl. .................. 174/50; 220/4 E; 220/18; 312/100; 317/120
[51] Int. Cl.² ..................................... H05K 5/00
[58] Field of Search ............... 174/50, 52 R, 37, 38; 220/4 B, 4 E, 18; 336/90; 317/120; 312/100

[56] References Cited
UNITED STATES PATENTS

| | | | |
|---|---|---|---|
| 2,272,178 | 2/1942 | McDowell et al. | 174/50 X |
| 2,601,056 | 6/1952 | Rapisarda | 220/18 X |
| 3,376,086 | 4/1968 | Fisher | 174/50 |
| 3,404,212 | 10/1968 | Mack et al. | 317/120 X |
| 3,513,248 | 5/1970 | Bright et al. | 174/50 X |
| 3,634,732 | 1/1972 | Finger et al. | 317/120 |
| 3,784,727 | 1/1974 | Haubein | 174/50 X |

FOREIGN PATENTS OR APPLICATIONS 1,001,265  8/1965  United Kingdom ................. 174/50

OTHER PUBLICATIONS

*Machine Design* Vol. 40, No. 29, pp. 15, 16 Dec. 12, 1968 Penton Publishing Co., Cleveland, Ohio.

*Primary Examiner*—J. V. Truhe
*Assistant Examiner*—David A. Tone
*Attorney, Agent, or Firm*—Eugene M. Eckelman

[57] ABSTRACT

An enclosure including a housing open at the bottom and arranged to conceal pad mounted equipment such as electrical equipment. The housing has one or more doors for access to the interior and includes at least one lateral rib in its walls for reinforcement. The housing is formed integrally from two molded joined sections and has a bottom inturned flange that reinforces the housing and also is used to secure the housing on a ground supported pad. The door is provided with an inturned peripheral flange and the housing around the door opening is formed with a semi-circular or U-shaped guard flange receiving the inturned flange on the door to provide a tamper-proof joint around the door.

9 Claims, 5 Drawing Figures

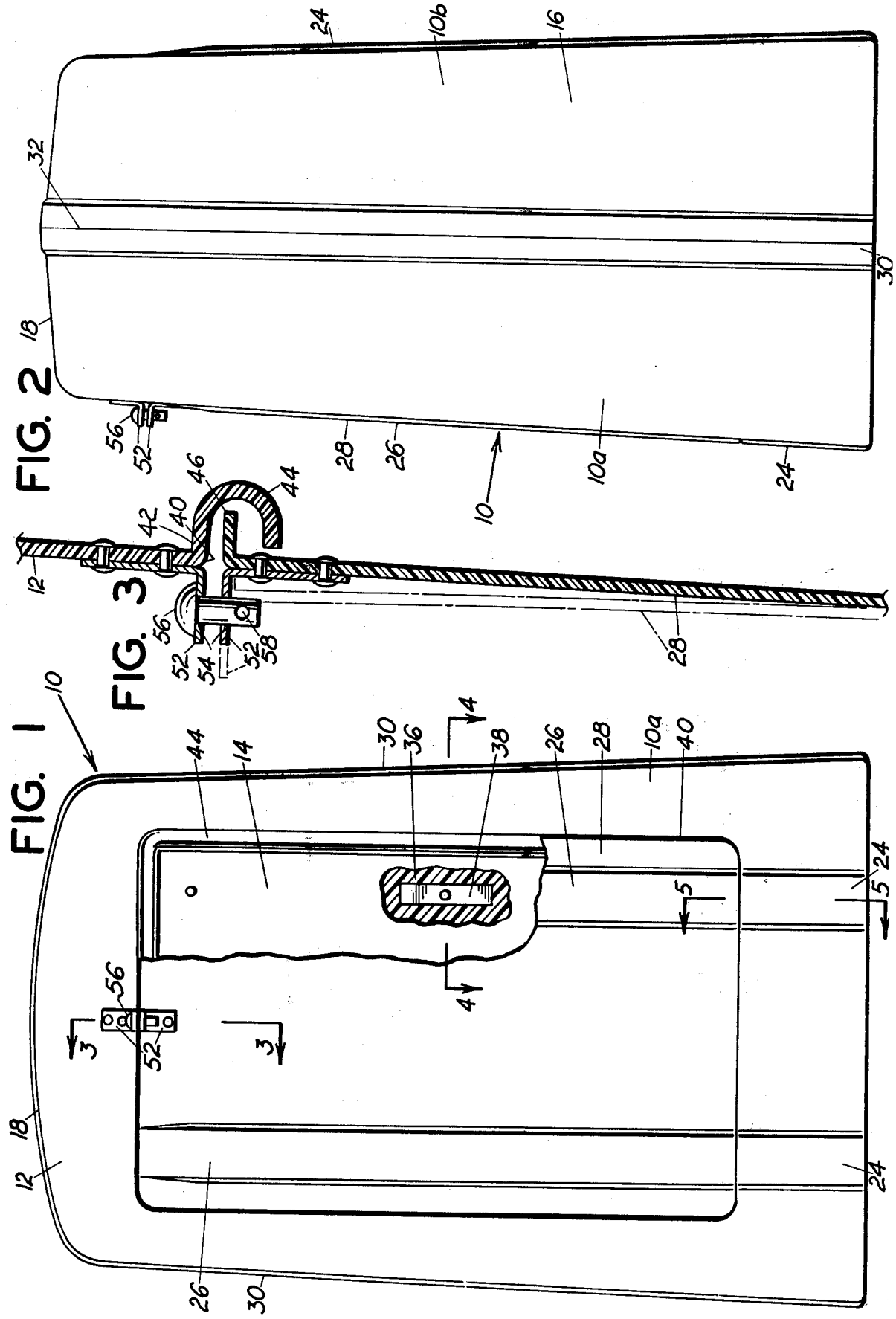

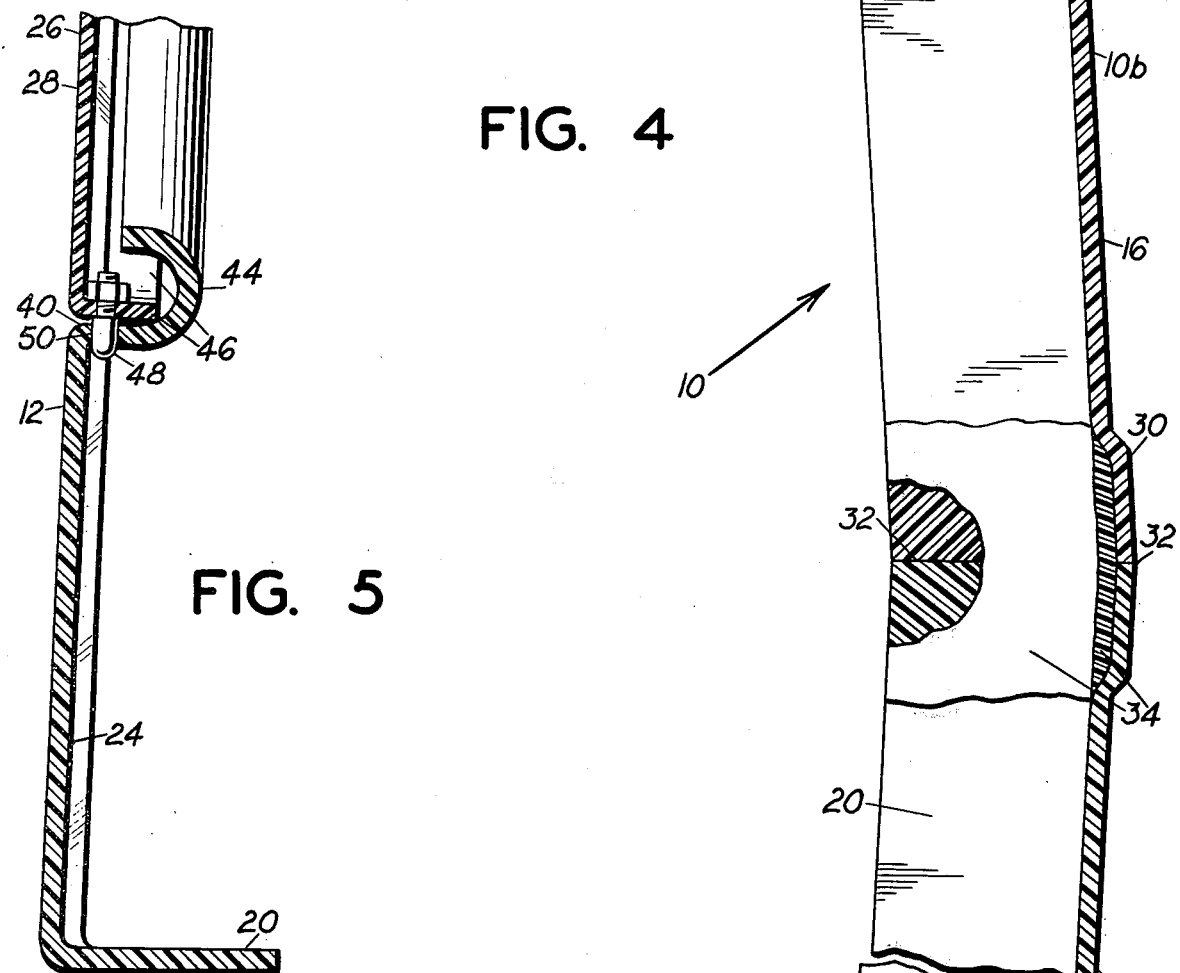

ENCLOSURE FOR PAD MOUNTED EQUIPMENT

BACKGROUND OF THE INVENTION

This invention relates to new and useful improvements in enclosures for pad mounted equipment.

Pad mounted enclosures have heretofore been provided for concealing various types of electrical equipment such as transformers and other mechanisms in distribution systems. It is extremely important in such equipment that unauthorized access to the interior of the enclosures be prevented. Such of course can be partly accomplished by sturdy construction of the housings and by use of sturdy lock means on the doors. However, the area around the door joints in the housing may be particularly vulnerable since the usual joint may possibly be penetrated by pushing a piece of wire or the like therethrough. While this type of entry may be remote, regulations require that the door joints be completely tamper proof.

SUMMARY OF THE INVENTION

According to the present invention and forming a primary objective thereof, an enclosure for pad mounted equipment is provided that employs a door joint positively preventing anyone from pushing a wire or the like therethrough and more particularly such is accomplished by providing associated flanges on the door and enclosure forming a reversely directed path through the joint so that a wire being pushed in the joint opening is reversed in direction and dead ends against a wall surface.

Another object of the invention is to provide an enclosure of the type described that is molded of dielectric material, the enclosure having a reinforcing rib extending up the sides and over the top and being formed into an integral unit from two molded sections with the securing joint between the two sections extending substantially centrally of said reinforcing rib.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is a front elevational view of an enclosure embodying features of the present invention, a portion of this view being broken away;

FIG. 2 is a side elevational view of the instant enclosure, this view being taken from the right side of FIG. 1;

FIG. 3 is an enlarged fragmentary sectional view taken on the line 3—3 of FIG. 1;

FIG. 4 is an enlarged fragmentary foreshortened sectional view taken on the line 4—4 of FIG. 1; and FIG. 5 is an enlarged fragmentary sectional view taken on the line 5—5 of FIG. 1.

DETAILED DESCRIPTION OF A PREFERRED EMBODIMENT

With particular reference to the drawings, the enclosure of the present invention comprises a housing 10 with upright walls consisting of a front end wall 12, a rear end wall 14, side walls 16, and a top wall 18. The bottom of the housing is open except that all the walls terminate at their bottom ends in an inturned flange 20, FIGS. 4 and 5, which serves as a footing for the enclosure. The enclosure is seated on a concrete pad or the like, not shown, and the flange 20 has openings 22 therein for receiving anchor bolts, also not shown, for firmly anchoring the enclosure in place on the pad. The flange 20 also adds strength to the housing and provides a good seal with the supporting pad without the necessity of using plastic trim around the base edge. Furthermore, attachment to the pad is accomplished without the need of molding anchor clips into the inner surface of the enclosure. The housing is tapered to a lesser dimension toward its upper end to increase the rigidity thereof as well as to enhance its appearance. The top wall 18 is arched slightly both longitudinally and laterally to further add to the rigidity of the structure and also to enhance its appearance.

The housing is reinforced structurally by ribs 24 formed vertically in the front and rear walls. The front ribs extend upwardly through a lower portion of the housing and are vertically aligned with ribs 26 formed in a door 28. A transverse reinforcing rib 30 also extends up the sides and over the top.

In a preferred construction, the housing 10 is formed from two molded sections 10a and 10b, best seen in FIGS. 2 and 4, and these two sections are secured integrally together to form the enclosure. More particularly, the two sections of the housing are molded of glass fiber or other high strength, corrosion free, dielectric material in separate molds, and the two sections are then joined along opposing straight edges 32. These edges are preferably secured together adhesively to form an integral, weather-tight joint.

As best seen in FIG. 2, the molded shape of the two housing sections is such that the connecting edge 32 extends substantially centrally of the lateral rib 30, and to reinforce the connection between the two body portions 10a and 10b, a filler layer 34 is laid in the inner cavity of the rib 30 and along the top of the inturned flange 20. Layer 34 may be formed of a glass fiber layup in conventional practice, and is securely welded in place by suitable resin treatment as well known in the art. Filler layers or segments 36, similar to layer 34 in rib 30 but not necessarily extending the full length of the ribs, are also provided in the inside cavity of rear ribs 24, FIGS. 1 and 4, and these filler layers are molded around hangers 38 or the like. Portions of the hangers project out of the layer 36 for supporting interior fixtures.

The formation of the housing in two sections facilitates easy manufacture. That is, by molding it in the two sections, the sections due to their tapered shape are readily extracted from the mold and the various construction and contours thereof as necessary are readily formed in a mold with a minimum of mold inserts. Furthermore, the two sections are more easily handled after molding than if one large enclosure were molded, and since one whole side of the molded pieces is open, namely, that side to which securement is to be made to the other sections, a workman can readily work the inner surface, as opposed to a one-piece housing fhere forking access can only be had through the bottom or through a door opening.

The door 28 of the housing is disposed in an opening 40 provided in the front wall 12. The door and housing are constructed especially to prevent persons from pushing wire or other material through the door joint, or otherwise to have access, and for this purpose the front wall 12 of the housing around the door opening has an inwardly extending flange 42 terminating in a semi-circular guard 44. The concave portion of the semi-circular guard 44 faces to the front, and the door 28 has a peripheral right angular flange 46 adapted to project into the concave portion of guard 44. The particular construction of the door and the housing at the door opening, comprising the inturned flange 46 on the door and the flange portions 42 and 44 on the housing, provide a joint which has a reversely directed path therethrough and therefore a path that makes it impossible for anyone to penetrate with a wire or the like. The type of joint described also eliminates the necessity of using sealing strips around the door or around the door opening.

The bottom flange 46 on the door has one or more locating pins 48, FIG. 5, arranged for engagement in apertures 50 in the flange 42, these parts being arranged such that upon reception of the pins 48 in the apertures 50 the front surface of the door will be substantially flush with the front surface of wall 12 when the door is closed.

The upper end of the door is locked in place, as by lock means comprising a pair of hasp members 52, FIGS. 1 and 2, one of which is on the front wall of the housing at the top of the opening and the other of which is on the door. These hasp members have apertures 54 to receive a lock pin 56 with a bottom aperture 58 arranged to receive a padlock, not shown.

In a preferred construction, the door is molded with a slight curvature in its vertical dimension and with the concaved portion of such curvature facing the front. Thus, when the door is being closed by swinging it in from the top, assuming that the locating pins 48 are first engaged in the apertures 50, the door must be forcibly sprung to a straight configuration to fully close it. FIG. 3 shows in phantom lines the normal or curved shape of the door and illustrates that in the closed position of the door as shown in full lines it must be sprung to a straight configuration so as to be fully closed and capable of receiving the lock pin 56. The curved shape of the door provides firm engagement of its flanges 46 at the sides with the flange portion 44, and such door when closed is thus firmly held against any play.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. An enclosure for electrical equipment of the type arranged to be seated on a ground supported pad, comprising
    a. a housing having side walls, front and rear end walls, and a top wall, the bottom being open,
    b. said housing being molded of dielectric material,
    c. means on said housing arranged to secure it to a ground supported pad,
    d. a door opening in one of said end walls,
    e. an inturned flange on said end wall around said door opening having an arcuate extension projecting into the door opening with its concaved portion facing outwardly,
    f. a door mounted in said opening in confined relation within said inturned flange,
    g. and an inturned flange on said door extending into the concave portion of the arcuate extension of the inturned flange on said end wall whereby to prevent unauthorized persons from pushing a foreign object through the joint.

2. The enclosure of claim 1 including locator pin and aperture means on the bottom of said door and in said inturned flange arranged to position said door in the opening and to hold the bottom of the door in place, and lock means at the top of said door and on said housing at the top of said door opening for securing the door in place.

3. The enclosure of claim 1 wherein the inturned flanges at the sides of said door opening are substantially straight and said door is vertically arcuate with the concave portion thereof facing out, whereby said door when mounted in said opening must be bent into a straight configuration, thus providing a firm engagement of the sides of the door with the housing.

4. The enclosure of claim 1 including rib means molded in said housing to extend up the sides and over the top for increasing the structural strength thereof.

5. The enclosure of claim 4 including rib means molded in said housing to extend up the end walls also for increasing the structural strength thereof.

6. The enclosure of claim 4 wherein said housing is formed from two molded sections comprising front and rear sections and said sections are joined substantially centrally of said rib means.

7. The enclosure of claim 1 wherein said means for securing the housing to a ground supported pad comprises an inturned flange at the bottom of at least some of said side walls and front and rear walls, and means in said inturned bottom flange for anchoring it on a supporting pad to hold the enclosure on the pad.

8. An enclosure for electrical equipment of the type arranged to be seated on a ground-supported pad, comprising:
    a. a housing having side walls, front and rear end walls, and a top wall, the bottom being open,
    b. means on said housing arranged to secure it to a ground supported pad,
    c. a door opening in one of said end walls,
    d. a door mounted in said opening,
    e. said housing being molded of dialectric material,
    f. outwardly projecting rib means molded in said housing up the sides and over the top for increasing the structural strength thereof,
    g. said housing being formed from two molded sections comprising front and rear sections and said sections being joined substantially centrally of said rib means,
    h. said rib means forming an internal cavity in the housing,
    i. and a filler layer secured in said cavity across the joint between said housing parts to reinforce such joint.

9. The enclosure of claim 8 wherein said means for securing the housing to a ground supported pad comprises an inturned flange at the bottom of at least some of said side walls and front and rear walls, and means in said inturned bottom flange for anchoring it on a supporting pad to hold the enclosure on the pad.

* * * * *